United States Patent
Kharraz et al.

(10) Patent No.: US 10,911,477 B1
(45) Date of Patent: Feb. 2, 2021

(54) EARLY DETECTION OF RISKY DOMAINS VIA REGISTRATION PROFILING

(71) Applicant: Verisign, Inc., Reston, VA (US)

(72) Inventors: Mohammadamin Kharraz, Malden, MA (US); Alireza Salimi, Reston, VA (US)

(73) Assignee: VERISIGN, INC., Reston, VA (US)

( * ) Notice: Subject to any disclaimer, the term of this patent is extended or adjusted under 35 U.S.C. 154(b) by 373 days.

(21) Appl. No.: 15/299,302

(22) Filed: Oct. 20, 2016

(51) Int. Cl.
*H04L 29/06* (2006.01)
*G06F 16/28* (2019.01)
*G06F 16/951* (2019.01)
*G06F 16/903* (2019.01)

(52) U.S. Cl.
CPC ........ *H04L 63/1441* (2013.01); *G06F 16/285* (2019.01); *G06F 16/90344* (2019.01); *G06F 16/951* (2019.01)

(58) Field of Classification Search
CPC ........... H04L 63/1441; G06F 17/30598; G06F 17/30864; G06F 17/30985
USPC .......................................................... 726/22
See application file for complete search history.

(56) References Cited

U.S. PATENT DOCUMENTS

| | | | | |
|---|---|---|---|---|
| 9,462,009 B1* | 10/2016 | Kolman | ............... | H04L 63/1425 |
| 2006/0212925 A1* | 9/2006 | Shull | ....................... | G06F 21/55 726/1 |
| 2011/0283357 A1* | 11/2011 | Pandrangi | ........... | H04L 63/1416 726/22 |
| 2012/0198549 A1* | 8/2012 | Antonakakis | ....... | H04L 61/1511 726/22 |
| 2013/0318603 A1* | 11/2013 | Merza | ................... | A61G 17/041 726/22 |
| 2016/0065534 A1* | 3/2016 | Liu | ....................... | H04L 63/1441 707/728 |
| 2016/0294859 A1* | 10/2016 | Choi | ....................... | G06F 21/00 |

* cited by examiner

*Primary Examiner* — Malcolm Cribbs
*Assistant Examiner* — Angela R Holmes
(74) *Attorney, Agent, or Firm* — Artegis Law Group, LLP (57) ABSTRACT

One embodiment of the present invention sets forth a technique for detecting malicious domains via registration profiling. The technique includes receiving domain registration information associated with a plurality of malicious domains and generating a plurality of domain clusters based on the domain registration information. The technique further includes comparing a domain registration profile associated with a candidate domain to the plurality of domain clusters to generate a similarity score and classifying the candidate domain as a malicious domain based on the similarity score.

21 Claims, 5 Drawing Sheets

EARLY DETECTION OF RISKY DOMAINS VIA REGISTRATION PROFILING

BACKGROUND OF THE INVENTION

Field of the Invention

Embodiments of the present invention relate generally to computer networking and, more particularly, to early detection of risky domains via registration profiling.

Description of the Related Art

Malware attacks commonly implement remote servers to deliver malicious payloads to infected computers. Attackers use a wide-range of techniques to create and maintain an infrastructure for launching such attacks. In particular, in order to create a reliable infrastructure that redirects an infected computer to a malicious server, an attacker needs to register a set of domain names with a domain name registrar, either before or during an attack. These domain names play an essential role in malware attacks in the wild.

In view of the damage malware attacks can cause, there have been significant research efforts directed towards automatically detecting domains that are used to control malware. For example, one technique for detecting malicious domains involves monitoring the DNS traffic behavior of infected machines to locate the command and control servers associated with malware attacks. Such an approach requires comparing a significant amount of network traffic associated with both benign and infected machines in order to identify abnormalities that are indicative of malware attacks.

In general, monitoring techniques are reasonably effective and provide reliable indications of malicious activity within various networks. However, such techniques are reactive in nature and, by definition, can detect control domains associated with malware attacks only after those attacks have already occurred. That is, the malicious domains are blacklisted only after those domains exhibit malicious activity, such as delivering a malicious payload to a target computer system. In addition, detecting a malware attack via some form of monitoring is typically restricted to a single network administrative domain and, as noted above, requires a substantial volume of network data from compromised machines in order to accurately model malicious traffic.

In an effort to identify malicious domains before such domains can exhibit malicious activity, other techniques focus on reverse engineering malware samples, determining current and future command and control server candidates based on the malware samples, and updating blacklists to reflect domains that are likely to be generated in the future. Unfortunately, these techniques suffer from several drawbacks. First, malicious activity associated with malware can be dependent on both internal or external triggers, such as time or the environment in which the malware is analyzed. Second, malicious activity generated by malware can change during the life cycle of the malware. For these reasons, reverse engineering malware and/or simulating malware behavior is error prone and can require significant time and effort. In the interim, before the relevant blacklists can be updated, end-users are left unprotected from malware attacks.

As the foregoing illustrates, what is needed in the art are more effective approaches to detecting potentially malicious domains before attacks can occur.

SUMMARY OF THE INVENTION

One embodiment of the present invention sets forth a method for detecting malicious domains via registration profiling. The method includes receiving domain registration information associated with a plurality of malicious domains and generating a plurality of domain clusters based on the domain registration information. The method further includes comparing a domain registration profile associated with a candidate domain to the plurality of domain clusters to generate a similarity score and classifying the candidate domain as a malicious domain based on the similarity score.

Further embodiments provide, among other things, a non-transitory computer-readable medium and a computing device configured to implement the method set forth above.

At least one advantage of the disclosed techniques is that risky domains can be automatically identified and added to watch lists before the domains have been used in an attack. Additionally, the techniques disclosed herein are scalable and are able to accurately distinguish between malicious domains and benign domains with a low false positive rate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1A:
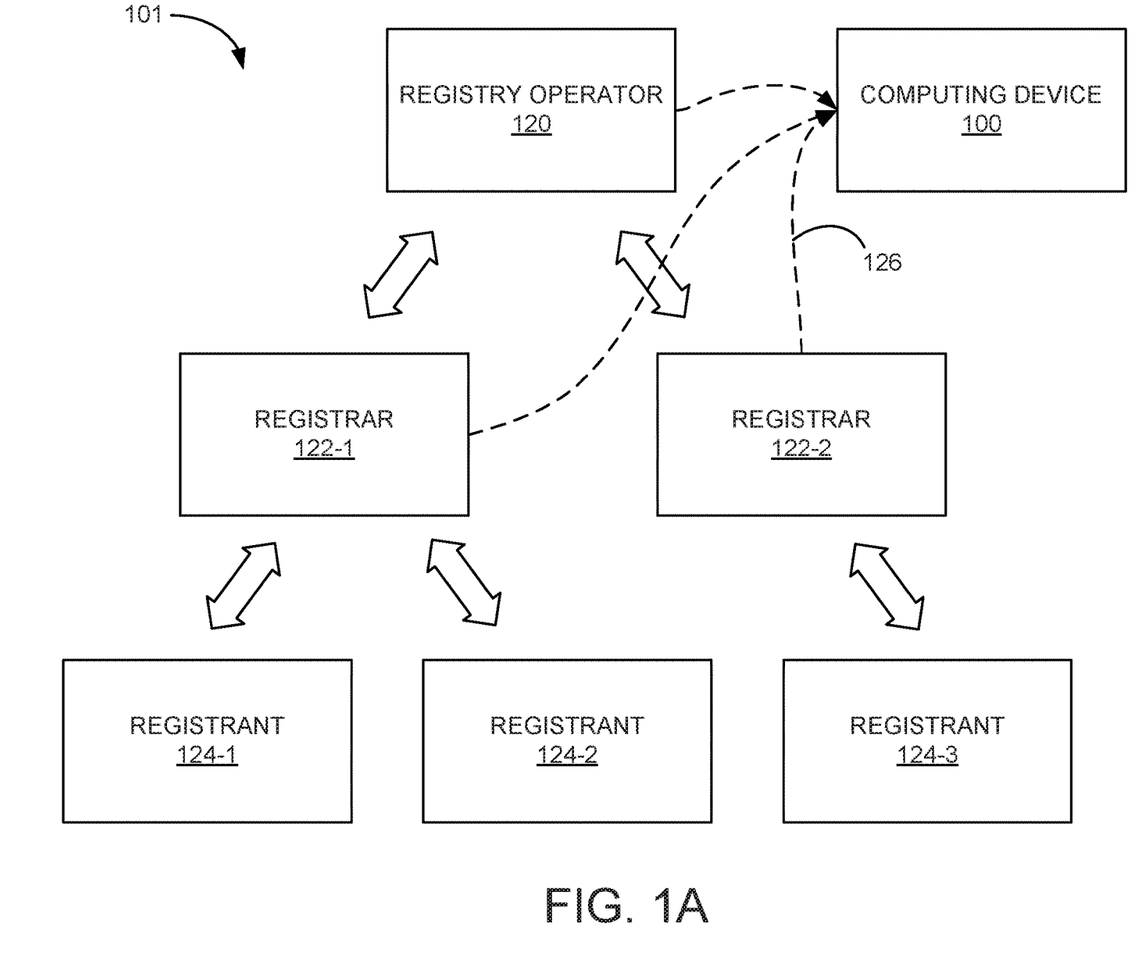
FIG. 1A is a conceptual illustration of a computer network in which one or more aspects of the present invention may be implemented.

FIG. 1A is a conceptual illustration of a computer network 101 in which one or more aspects of the present invention may be implemented. As shown, the computer network 101 may include one or more registry operators 120, one or more registrars 122 (e.g., registrar 122-1 and registrar 122-2), and one or more registrants 124 (e.g., 124-1 through 124-3).

The registry operator 120 manages one or more top-level domains (TLDs), for example, by setting rules for domain names associated with a TLD, working with authorized registrars 122 to license domain names included in a TLD, and by tracking records of registrant 124 information for domain names. A registrant 124 interacts with a registrar 122 to license a domain name, which generally represents an Internet Protocol (IP) resource, such as a network database, a server computer hosting a website, a personal computer, or other services or devices that communicate via the Internet.

Figure 1B:
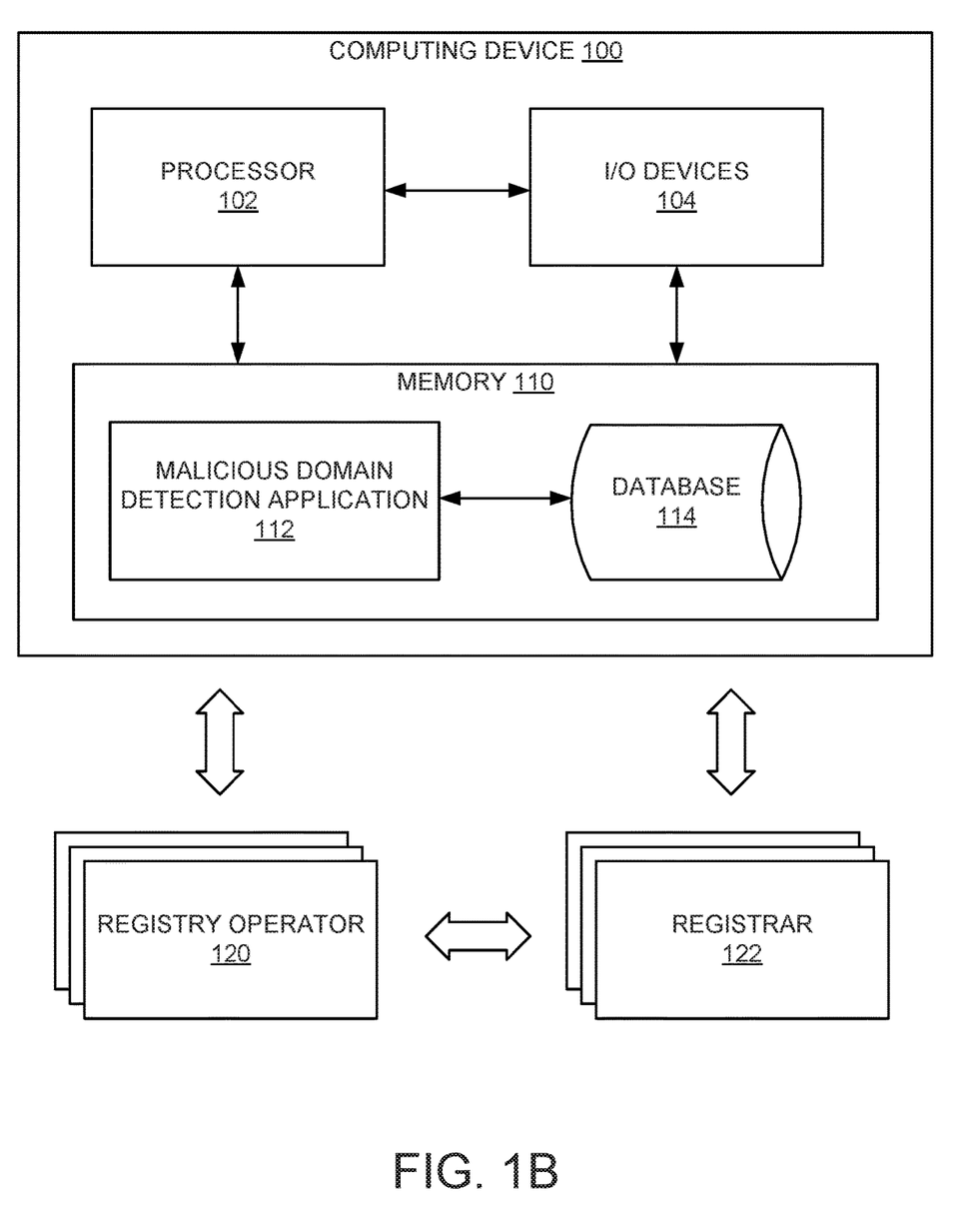
FIG. 1B is a conceptual illustration of the computing device shown in FIG. 1A, according to various embodiments of the present invention.

FIG. 1B is a conceptual illustration of the computing device 100 shown in FIG. 1A, according to various embodiments of the present invention. As shown, the computing device 100 may receive registration information 126, such as information about a registrant 126 or WHOIS information associated with a particular domain, from one or more registrars 122 and/or registry operators 120.

The computing device 100 includes a processor 102, input/output (I/O) devices 104, and a memory 110. The memory 110 includes a malicious domain detection (MDD) application 112 configured to interact with a database 114. The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. The MDD application 112 within memory 110 is executed by the processor 102 to implement the overall functionality of the computing device 100. For example, and without limitation, domains received by the computing device 100 may be analyzed by the MDD application 112 to generate domain registration profiles and registration templates and to perform comparisons between the domain registration profiles and one or more of the registration templates. Database 114 within memory 110 may store registration information 126, blacklists, algorithms, parameters, lookup tables, and/or other types of data associated with domains, network addresses, statistical analyses, etc.

I/O devices 104 may include input devices, output devices, and devices capable of both receiving input and providing output. For example, and without limitation, I/O devices 104 could include wired and/or wireless communication devices that send data to and/or receive data via a local area network and/or wide area network from a registry operator 120, a registrar 122, a storage device, a networking device, and/or another computing device.

As described above, conventional techniques that monitor traffic behavior are effective and provide a reliable indication of malicious activity in the network. However, such reactive techniques are able to detect malware-control domains only after an attack has occurred, such as after a malicious payload has been delivered to infected computers. Further, conventional techniques for identifying malware-control domains that focus on reverse engineering malware samples and predicting domain names that may be used in a future attack are not scalable. In particular, malicious activity associated with malware samples can be dependent on internal or external triggers and can change during the life cycle of the malware. Consequently, analyzing malware samples often requires significant time and effort, leaving end-users unprotected until blacklists are updated to include the malicious domains accessed by the malware samples.

Accordingly, various embodiments described herein are focused on proactively identifying domains that are likely to be used by attackers for malicious activity after the domains are registered, but before the domains are involved in a malicious attack. Various techniques described here are based, in part, on the following insights and observations. First, malware-control infrastructures can be viewed as a content distribution infrastructure including domains that are designed to deliver malicious payloads and redirect traffic to available servers. Second, attackers typically register malicious domains on a limited set of servers, for example, in order to receive discounts from registrars. Third, the degree of similarity between registration information associated with a newly-registered domain and the registration information of malicious, neighboring domains can potentially indicate how a newly-registered domain will be used in future. These insights are implemented in the various embodiments described below.

Early Detection of Risky Domains Via Registration Profiling

In various embodiments, three main steps are implemented to identify malicious domains. First, the MDD application 112 clusters known malicious domains based on registration profiles associated with the malicious domains. Generating registration profiles and identifying features in these profiles that are indicative of malice enables the MDD application 112 to proactively identify potentially malicious domains before such domains are used in an attack. The registration profile for each malicious domain may be constructed by extracting metadata for subsequent analysis. This metadata may include, for example, information from the WHOIS record of the domain, the corresponding network address(es), and the malware domains that resolve to the same network address.

Second, the MDD application 112 generates one or more registration templates for each cluster. In some embodiments, a registration template includes a summary of the domains in that particular cluster. The use of registration templates may reduce the number of similarity tests that must be performed in the third step, in which the MDD application 112 determines a degree of similarity between a candidate domain and one or more registration templates. Specifically, in some embodiments, the MDD application 112 determines a degree of similarity between the registration profile of a candidate domain (e.g., a newly-registered domain) and the registration template for the address space (e.g., a subnetwork) with which the candidate domain is associated.

If the degree of similarity between the registration profile of a candidate domain and a registration template exceeds a threshold level, then the candidate domain may be classified as a potentially malicious domain. The output of the MDD application 112 may then be used for malware defense purposes, by domain registrars, and/or by blacklist operators. That is, these users can obtain, in advance, a list of suspicious domains to place on watch lists. Various techniques for clustering malicious domains, generating registration templates, and comparing the templates to registration profiles associated with candidate domains as described below in further detail in conjunction with FIGS. 2A, 2B, and 3.

Figure 2A:
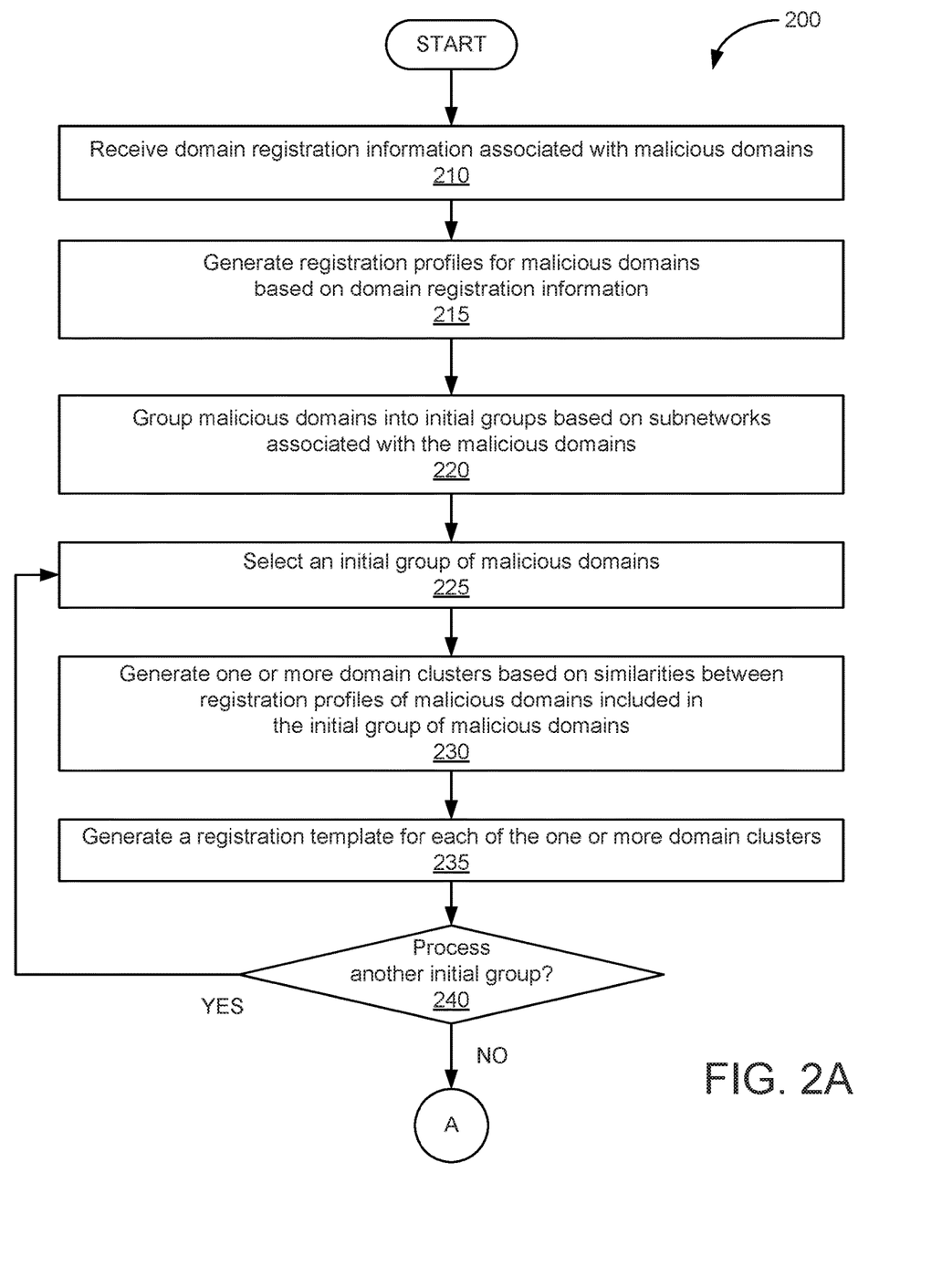
FIGS. 2A and 2B illustrate a flow diagram of method steps for detecting malicious domains via registration profiling, according to various embodiments of the present invention.
Figure 2B:
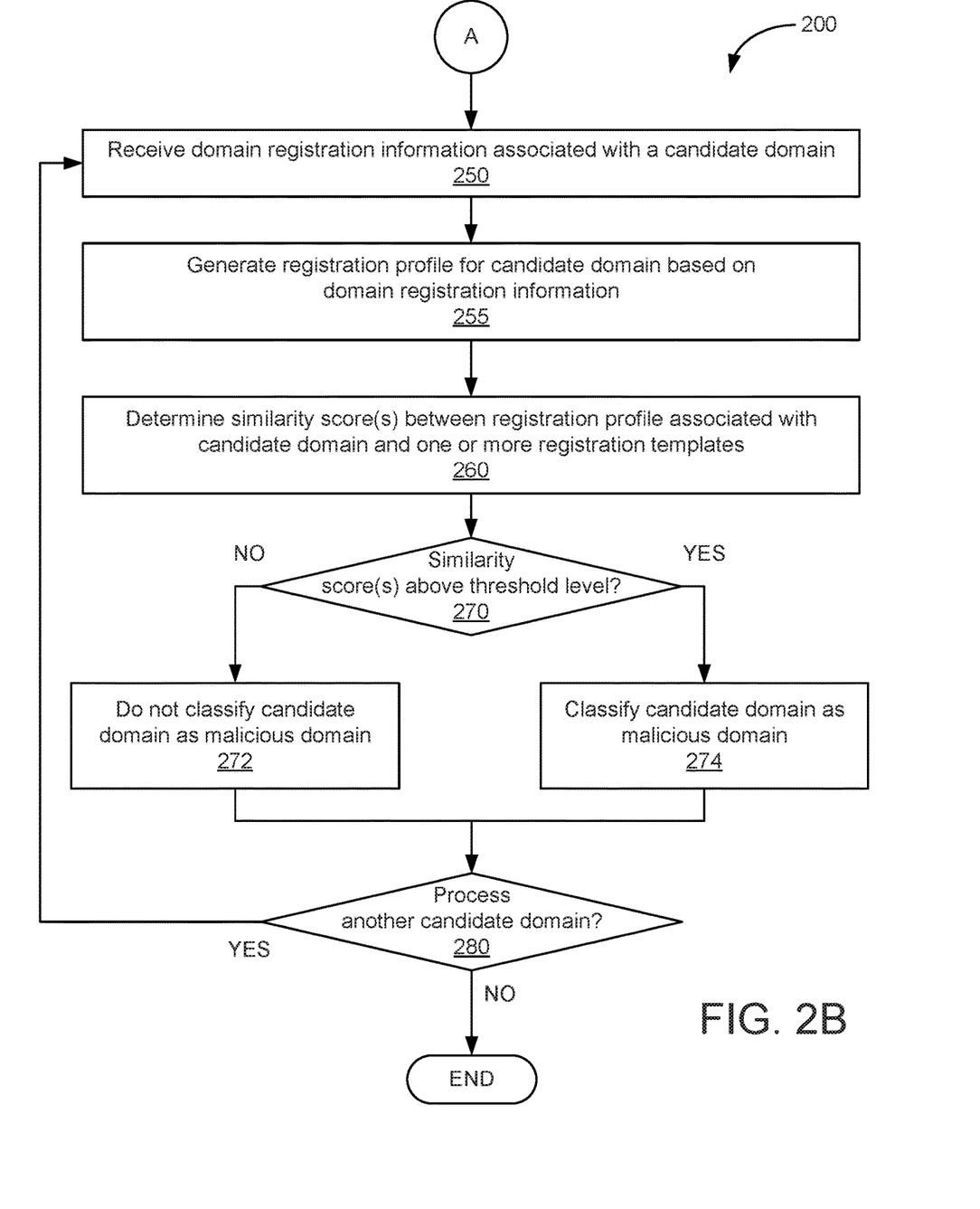

FIGS. 2A and 2B illustrate a flow diagram of method steps for detecting risky domains via registration profiling, according to various embodiments of the present invention. Although the method steps are described in conjunction with the system of FIG. 1, persons skilled in the art will understand that any system configured to perform the method steps, in any order, falls within the scope of the present invention.

As shown in FIG. 2A, a method 200 begins at step 210, where the MDD application 112 receives domain registration information associated with known and/or suspected malicious domains. In some embodiments, domain registration information may be received from blacklist operators, domain registrars, WHOIS queries, database 114, one or more remote databases, etc. Then, at step 215, the MDD application 112 generates a registration profile for each of the malicious domains based on the domain registration information.

In some embodiments, at step 215, for a given domain name d, the MDD application 112 constructs a registration profile $r_d$ that characterizes specific properties of the domain registration. For example, the MDD application 112 could generate a registration profile that includes a name format field, a name selection field, registrar data, registrant data, a registration age, and/or infrastructure data. With respect to the name format field, the MDD application 112 could parse the domain name into a sequence of components and transform each of the components into a grammar symbol corresponding to a data type. For example, the name format for the hypothetical domain name 473874-cgfddze48.com could be defined as the sequence {int <6>, non_alphanumeric <1>, str <7>, int <2>} that encodes each component's data type as well as the length of the component.

With respect to the name selection field, the MDD application 112 may characterize the selection criteria for a domain name as meaningful, non-meaningful, or "typosquatting" (i.e., including a typographical error of a meaningful word) based on a two-step procedure. First, the MDD application 112 uses the name format to determine whether the domain contains one or more substrings (e.g., the "cgfddze" substring). The MDD application 112 then checks each substring to determine whether a random string is present. In some embodiments, for each extracted substring, the MDD application 112 consults a dictionary to determine whether the substring is meaningful. If a dictionary includes the substring, then the substring may be classified as meaningful. Notably, however, a dictionary may not include certain classes of words, such as special names or words that are commonly used but which are not necessarily meaningful. Consequently, in order to overcome these issues, in some embodiments, the MDD application 112 may query one or more search engines and analyze the search results that are produced. If the results of the query contain an automatic word correction, the MDD application 112 may classify the substring as typosquatting, with the assumption that search engines automatically detect and correct search terms that have an incorrect spelling. The MDD application 112 then assigns a label (e.g., meaningful, non-meaningful, and typosquatting) for the name selection field based on the two-step approach described above.

With respect to registrar data that may be included in a registration profile, when a registrant purchases a new domain, the registrar typically sends a request to the registry operator with the domain and name server information. Once the domain goes live, the domain will appear in that top-level domain's (TLD's) zone file. The registrar maintains the identity and nature of the registrant as well as the contract for the registered domain. Additionally, the registrar component in the registration profile typically contains a registrar ID number. Although attackers may use different domain names to carry out attacks, the attackers typically perform bulk domain registration in order to receive discounts from the registrars, or because the domain registration is essentially free of charge. Accordingly, in some embodiments, the MDD application 112 includes the registrar ID number in the registration profile of the domain.

With respect to registrant data, the registrant record associated with a particular domain can include either a real or fake identity. Attackers commonly use fraudulent and fake information to register their domains. Because malware domains are relatively disposable and may exist for only a few hours, attackers may employ very similar, or even identical, contact information data to purchase domains. Consequently, the MDD application 112 may include this information in the registration profile and subsequently compare, at step 260, the information to registration profiles associated with candidate domains to more effectively identify malicious domains.

Further, attackers may also use privacy protection services to hide their identities. While these services are intended to be used to protect the privacy of the registrant in WHOIS records, attackers commonly misuse these services to hide their real identity and complicate attack attribution. Accordingly, in some embodiments, the MDD application 112 accesses a list of privacy protection services and determines whether the WHOIS record of a given domain contains a privacy protection service. The MDD application 112 may then create a vector of the name, email address, and registration address provided in the WHOIS record of the domain and include the vector in the registrant data of the registration profile.

The MDD application 112 may further store the registration age of a domain in the registration profile. The registration age is the length of time that the domain has been registered. In some embodiments, the MDD application 112 extracts the creation date and time of the domain and calculates the registration age. The MDD application 112 may then, at step 260, compare the registration dates and/or times of domain names to identify domain names that were registered around the same time as known malicious domains. In particular, domain names that resolve to the same address space and are registered in the same day have a higher chance of being registered by the same entity. Accordingly, such information can be used to identify domains that are likely to engage in malicious activity in the future.

With respect to infrastructure data, for each domain, the MDD application 112 may extract information regarding background infrastructure that serves the domain. For example, the MDD application 112 could access the WHOIS record to obtain the address record (A), the IPv6 address record (AAAA), the name server record (NS), the mail exchange record (MX), the text record (TXT), and/or the canonical name record (CNAME) for the domain name. Every domain requires this information to resolve. The MDD application 112 could then aggregate all of the name servers and/or all of the destination addresses that a domain resolved to during the lifetime of the domain. Opportunistic attackers actively try to evade blacklists and employ various techniques to map the registered domain to multiple IP addresses. However, unlike benign services, attackers typically use a small set of servers to host malicious web pages that deliver malware or are used to control infected machines. As a result, similarities between these records may indicate that domains were registered by the same entity.

Next, at step 220, the MDD application 112 groups the malicious domains into initial groups based on the network addresses associated with the malicious domains. In some embodiments, the MDD application 112 generates the initial groups based on the subnetwork with which each malicious domain is associated. For example, the MDD application 112 could generate initial groups $M_{(P)}=\{D^{(i)}\}_{i=1...T}$, where P is a particular subnetwork (e.g., a /32 subnetwork, a /24 subnetwork, or a /22 subnetwork) having T domain names. Notably, grouping domains based on a /24 network prefix appears to provide better true positive rates.

There are at least two reasons to group malicious domains in this manner. First, attackers generally try to maximize the availability of resources while minimizing their expenses. Registering domains and servers is associated with costs that attackers attempt to minimize in order to increase profits. Consequently, multiple malicious domains are typically co-located on the same server. Similarly, different malware types are commonly co-located on the same domain. By contrast, benign domains are less likely to operate in this manner, since this approach violates the idea of redundancy. Second, grouping domain names based on the IP addresses to which they resolve allows the MDD application 112 to decrease the computational cost of the clustering process. In particular, grouping malicious domains in this manner decreases the computational cost of generating a registration template based on the registration profiles associated with the malicious domains.

After grouping the malicious domains into initial groups based on IP address, at steps 225 and 230, the MDD application 112 considers each initial group as a separate malicious domain set and divides each group into smaller clusters of malicious domains. More specifically, at step 225, the MDD application 112 selects an initial group and, at step 230, generates one or more domain clusters based on the registration profiles associated with the malicious domains included in the initial group. This approach produces well-separated domain clusters that share the least number of common properties, in terms of registration data, with other clusters in the group of malicious domains.

Registration profile clustering enables the MDD application 112 to construct tight clusters of malware domains that have structural similarities and/or are co-located on the same infrastructure. In some embodiments, the MDD application 112 clusters the domains included in each initial group $M_{(P)}$ based on a similarity function that computes distances between pairs of registration profiles. For example, the MDD application 122 could calculate the minimum distances (e.g., Jaccard distances, Levenshtein distances, etc.) among the registration profiles included in the initial group and then apply an agglomerative hierarchical clustering algorithm to group domain names based on the distances. The resulting dendrogram indicates the distances between clusters. The MDD application 112 could then perform cluster validity analysis (e.g., by applying the Davies-Bouldin cluster validity index) in order to find the best height at which to "cut" the dendrogram to produce well-separated domain clusters. In various embodiments, a value of 0.32 was determined as a dendrogram cut height that produced well-separated domain clusters.

In various embodiments, the MDD application 112 performs domain clustering based on one or more of the following features included in the registration profiles:

t represents the set of name format components extracted from each domain name. Distance function $d_t=(t_x, t_y)$ may be defined as the Jaccard distance between the sets of components in the two domains.

r represents the network addresses that the two domains share during their lifetime. Distance function $d_r=(r_x, r_y)$ may be defined as the Jaccard distance between the network addresses that the two domain names use.

g represents registration information for the given domain (g={name, email, registrar id}). Distance function $d_g=(g_x, g_y)$ may be defined as the normalized Levenshtein distance between the strings that appear in two registrations.

b is the set of name servers used by a domain over its lifetime. Distance function $d_b=(b_x, b_y)$ may be defined as the Jaccard distance between the name servers for two domains.

p represents the registrant type. Distance function $d_p=(p_x, p_y)$ may be equal to 1 if the domain $p_x$ and $p_y$ both use a protected registrant.

s is the registration age ratio of two domains. The registration age ratio, $d_s=(s_x, s_y)$, may be defined between zero and one and represents the similarity between the ages of the domains. For example, $d_s$ would be equal to 1 if the two domains were registered on the same day.

The overall distance between two registration profiles could then be determined based on Equation 1, shown below, where $w_i$ is the predefined weight for the component level i in each registration profile.

$$d(r_g, r_h) = \frac{1}{k}\sum_{i=1}^{k} w_i \cdot d_i(p_{g_i}, p_{h_i}) \quad (1)$$

The value of each $w_i$ is based on the importance of the distance between the components of registration profiles of two domains. For example, the MDD application 112 could assign a higher weight (i.e., more importance) to identical registrant data and assign a lower weight to similarities (or dissimilarities) in string format. In particular, it has been observed that, in a large-scale test, nondeterministic techniques (e.g., generating strings that do not follow any patterns) mainly occur in a few components of the registration profiles (e.g., string format). In some embodiments, the $w_i$ for i∈{t, r, g, b, p, s} defined in the Equation 1 may be set equal to $w_t=0.9$, $w_r=1.0$, $w_g=1.0$, $w_b=1.0$, $w_p=1.0$, $w_s=1.0$.

Once the domain clusters are generated, at step 235, the MDD application 112 generates a registration template for each of the domain clusters. Each registration template summarizes the malicious domains included in the corresponding domain cluster. In some embodiments, the registration template represents the centroid of the domain cluster from which it was derived. Accordingly, in order to determine if the registration profile of a candidate domain is similar to a given domain cluster, the MDD application 112 may compare the registration profile of the candidate domain to the registration template of the domain cluster, rather than comparing the registration profile to all of the domains within the domain cluster. Consequently, registration templates provide an efficient means of measuring the similarity of a newly-registered domain with the malicious domain dataset clustered by the MDD application 112.

In various embodiments, the MDD application 112 generates registration templates according to the following process. Let $D_i$ be a domain cluster, and $P_i=\{P(d_k)\}_{k=1...Di}$ be the set of registration profiles included in $D_i$. The MDD application 112 may then define the centroid of $D_i$ as a set of $C_i=\{c_j\}_{j=1...n}$ where each $c_j$ is the value of component j in the registration profiles of the given domain cluster. Then, in order to generate the centroid $C_1$, the MDD application 112 may randomly select one of the registration profiles in the domain cluster $D_i$ to be the centroid seed. Suppose the MDD application 112 selects $P(d_a)$, the registration profile of domain $d_a$, as the centroid seed. As discussed above with respect to step 215, $P(d_a)$ may include multiple components (e.g., a name format field, a name selection field, registrar data, registrant data, a registration age, and/or infrastructure data).

The MDD application 112 could then initialize the set $C_i$ by putting each component j in the set $c_j$. Next, the MDD application 112 could apply Equation 1 to calculate the distance between two registration profiles, find the registration profile with the highest similarity score, and add the components in the corresponding registration profile to each set $c_j$ that constitutes $C_i$. The MDD application 112 then repeats this procedure for all of the registration profiles included in the domain cluster $D_i$. After the MDD application 112 populates the centroid $C_i$ with the components of registration profiles in the domain cluster $D_i$, the resulting registration template accurately represents the domain cluster.

At step 240, the MDD application 112 determines whether to process another initial group of malicious domains. If the MDD application 112 determines that another initial group should be processed, then the method 200 returns to step 225. If the MDD application 112 determines that no other initial groups are to be processed, then the method 200 proceeds to step 250, shown in FIG. 2B.

At step 250, the MDD application 112 receives domain registration information associated with a candidate domain d (e.g., a newly-registered domain). Then, at step 255, the MDD application 112 generates a registration profile for the candidate domain d based on the domain registration. In various embodiments, at step 255, the MDD application 112 may generate a registration profile in substantially the same manner as described above with respect to step 215.

Returning the step 250, in some embodiments, the MDD application 112 may pre-filter candidate domains to improve detection accuracy. For example, if the MDD application 112 determines that a candidate domain resolves to an address space that also hosts one of the top 20,000 Alexa websites, then that candidate domain may be excluded from the list of malicious domains. Commonly, such domains are sibling domain names or parked domains that brand owners intentionally register to protect websites against typosquatting attacks. Accordingly, by integrating other sources of information, the MDD application 112 is able to further reduce the false positive rate to a manageable level.

Next, at step 260, the MDD application 112 determines similarity scores between the registration profile associated with the candidate domain d and one or more registration templates f associated with the malicious domain clusters. In some embodiments, the MDD application 112 determines a similarity score by first comparing d's string format with the string format of the registration template f. The MDD application 112 then determines whether the destination address of the candidate domain d resides within any of the subnetworks (e.g., /24 network prefixes) included in the registration template f. If neither the string format nor the destination address matches, then the MDD application 112 may determine that the candidate domain d does not match the registration template f. The MDD application 112 may then continue to compare the registration profile of the candidate domain d with the registration templates f of the remaining domain clusters.

If either the string format or the destination address matches, then the MDD application 112 proceeds by comparing the entire registration profile to the registration template f and determining a similarity score S(d, f) between components of the registration profile and the registration template f. The MDD application 112 continues this process of determining similarity scores until each of the registration templates has been processed or, alternatively, until a similarity score associated with one of the registration templates f exceeds a threshold level, as discussed below.

In various embodiments, the MDD application 112 may determine similarity scores based on the following process. In this description, component i in the registration profile $P(d)$ is referred to as $P(d_i)$. With respect to $P(d_1)$, the MDD application 112 compares the data types and lengths of the values included in the candidate domain name string. For example, for each component of the string in candidate domain d, the MDD application 112 could assign a score of 1 if the data type in d matches the data type included in the registration template f. Additionally, the MDD application 112 could determine a ratio between the length of each data type in d and f. The MDD application 112 may then compute the final score as the average of all assigned scores, where, the higher the degree of similarity between the number of data types and lengths, the higher the similarity score.

With respect to $P(d_2)$, if the destination address of the candidate domain d resides within any of the /24 network prefixes in the set of addresses in the registration template f, then the MDD application 112 may assign a score 1. Otherwise, the MDD application 112 assigns a score of 0. With respect to $P(d_3)$, given the set of name servers in the registration template f, the MDD application 112 assigns a score 1 if the name servers of the candidate domain d reside in the set. Otherwise, the MDD application 112 assigns a score of 0.

With respect to $P(d_4)$, let g be the vector of registrant data of the candidate domain d. If g matches any of the members in the set of registrant records in registration template f, then the MDD application 112 may assign a score of 1. Otherwise, the MDD application 112 assigns a score of 0. With respect to $P(d_5)$, the MDD application 112 compares the registration age of the candidate domain d with the median registration age of the domains within the domain cluster to compute a registration age ratio. The registration age ratio resides between [0,1]. A registration age ratio close to 1 means that the candidate domain d was registered within the time period that malicious domains included in the domain cluster were registered.

The similarity score between the registration profile associated with the candidate domain d and a registration template f may then be determined by the MDD application 112 as the arithmetic average of similarity at each level(dpth) according to Equation 2, shown below. Since the right side of Equation 2 always lies between [0,1], the similarity score between the candidate domain d and the registration template f is between [0,1].

$$S(d, f) = \frac{1}{\delta} \sum_{dpth=1}^{\delta-1} S(d_{dpth}, f_{dpth}) \quad (2)$$

Next, at step 270, the MDD application 112 determines whether one or more of the similarity scores exceeds a threshold level $\alpha$. In various embodiments, a threshold level of approximately 0.80 to 0.85 is implemented by the MDD application 112 in order to reduce the number of false positives to an acceptable level. If the MDD application 112 determines that at least one of the similarity scores exceeds the threshold level α, then, at step 274, the MDD application 112 classifies the candidate domain d as a malicious domain. If the MDD application 112 determines that none of the similarity scores exceed the threshold level α, then, at step 274, the MDD application 112 does not classify the candidate domain d as a malicious domain.

The method 200 then proceeds to step 280, where the MDD application 112 determines whether another candidate domain d should be processed. If the MDD application 112 determines that another candidate domain d should be processed, then the method 200 returns to step 250. If the MDD application 112 determines that no additional candidate domains d are to be processed, then the method 200 terminates.

Figure 3:
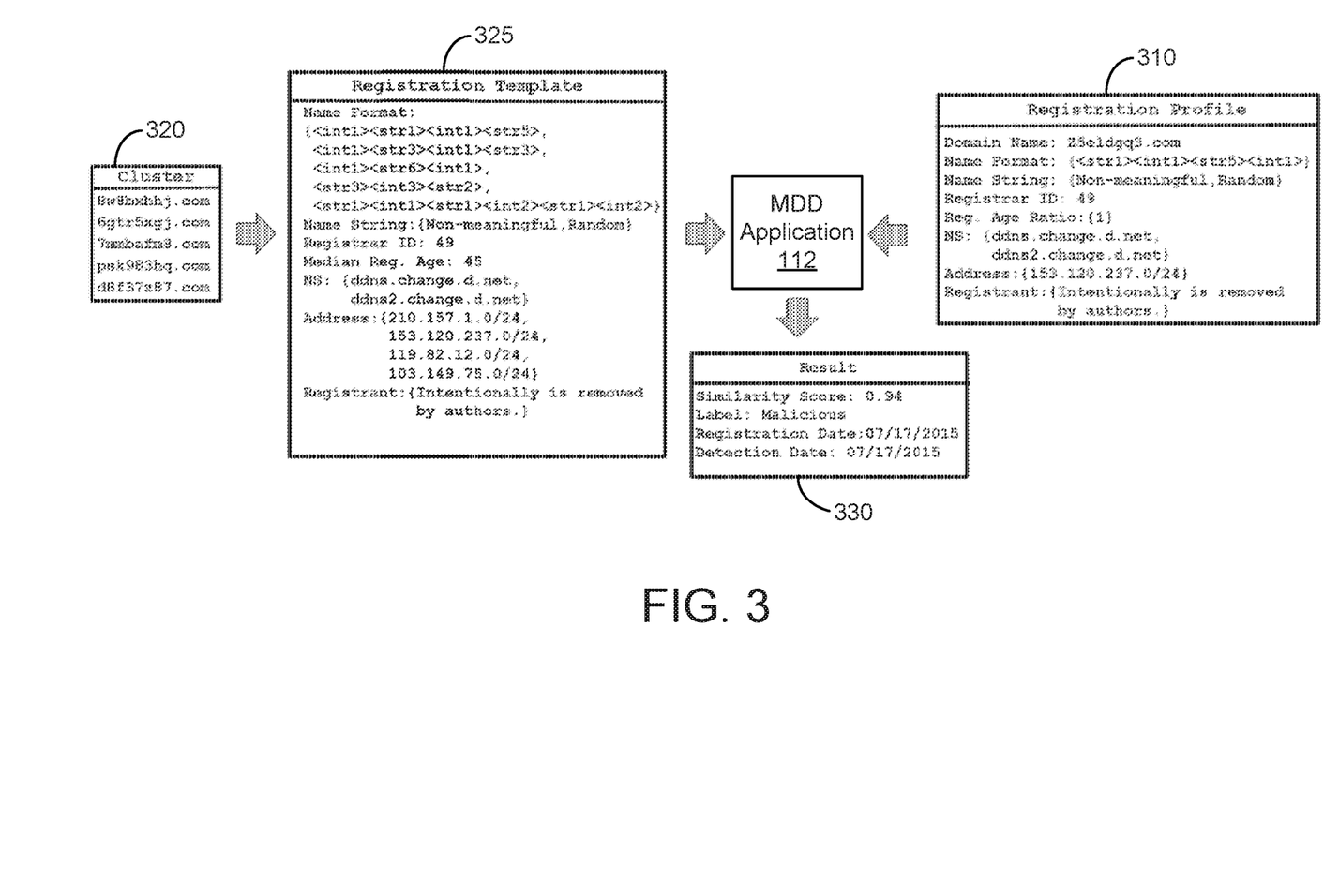
FIG. 3 is a conceptual diagram of a technique for detecting a malicious domain by comparing a registration profile to a registration template, according to various embodiments of the invention.

FIG. 3 is a conceptual diagram of a technique for detecting a malicious domain by comparing a registration profile 310 to a registration template 325, according to various embodiments of the invention. As shown, the registration profile 310 associated with a candidate domain may include multiple fields, such as a domain name, a name format field, a name string field, a registrar ID, a name server field, a subnetwork address field, and a registrant field. As described above in conjunction with FIGS. 2A and 2B, a registration template 325 may be generated based on the registration information associated with each domain cluster 320. The MDD application 112 then compares each registration template 325 to the registration profile 310 in order to determine a similarity score. As shown, if the similarity score exceeds a threshold level (e.g., 0.80 to 0.85), then the candidate domain is classified as malicious.

In sum, a malicious domain detection (MDD) application clusters known malicious domains based on registration profiles associated with the malicious domains. The MDD application then generates one or more registration templates for each cluster. Next, the MDD application determines a degree of similarity between a candidate domain and one or more registration templates. If the degree of similarity between the registration profile of a candidate domain and a registration template exceeds a threshold level, then the MDD application classifies the candidate domain as a potentially malicious domain.

At least one advantage of the disclosed techniques is that risky domains can be automatically identified and added to watch lists before the domains have been used in an attack. Additionally, the techniques disclosed herein are scalable and are able to accurately distinguish between malicious domains and benign domains with a low false positive rate.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to perform the steps of:
receiving domain registration information associated with each of a plurality of malicious domains, wherein the domain registration information associated with a given malicious domain included in the plurality of malicious domains includes information with which the malicious domain was registered with a corresponding registration entity;
generating a plurality of domain clusters based on the domain registration information and a length of time that each of the plurality of malicious domains is registered with the corresponding registration entity;
comparing a domain registration profile associated with a candidate domain to the plurality of domain clusters to generate a similarity score; and
classifying the candidate domain as a malicious domain based on the similarity score.

2. The non-transitory computer-readable storage medium of claim 1, further comprising, for each domain cluster included in the plurality of domain clusters, generating a registration template, and wherein comparing the domain registration profile associated with the candidate domain to the plurality of domain clusters comprises comparing the domain registration profile to the registration templates.

3. The non-transitory computer-readable storage medium of claim 2, wherein comparing the domain registration profile to the registration templates comprises:
for each of the registration templates, determining a similarity score between the domain registration profile and the registration template;
determining that at least one of the similarity scores is above a threshold level; and
in response, classifying the candidate domain as a malicious domain.

4. The non-transitory computer-readable storage medium of claim 3, wherein determining the similarity score between the domain registration profile and the registration template comprises comparing a first subnetwork, first registrant information, and first registration time included in the domain registration profile to a second subnetwork, second registrant information, and second registration time included in the registration template.

5. The non-transitory computer-readable storage medium of claim 2, wherein generating the registration template for the domain cluster comprises determining a centroid of the domain cluster based on the domain registration information associated with each malicious domain included in the plurality of malicious domains that is also included in the domain cluster.

6. The non-transitory computer-readable storage medium of claim 1, wherein generating the plurality of domain clusters comprises:
generating, for each malicious domain included in the plurality of malicious domains, a malicious domain registration profile based on the domain registration information associated with the malicious domain; and
generating a plurality of initial groups of malicious domains based on network addresses associated with the malicious domain registration profiles, wherein each initial group of malicious domains included in the plurality of initial groups of malicious domains is associated with a different subnetwork.

7. The non-transitory computer-readable storage medium of claim 6, wherein each initial group included in the plurality of initial groups includes one or more malicious domains having a different /24 subnetwork.

8. The non-transitory computer-readable storage medium of claim 6, wherein generating the plurality of domain clusters further comprises, for each of the initial groups of malicious domains:
computing distances between different pairs of the malicious domain registration profiles associated with the initial group of malicious domains; and
based on the distances, applying one or more hierarchical clustering operations to group the malicious domains included in the initial group of malicious domains into one or more domain clusters included in the plurality of domain clusters.

9. The non-transitory computer-readable storage medium of claim 8, wherein computing the distances between the different pairs of the malicious domain registration profiles comprises comparing subnetworks, registrant information, and registration ages included in each different pair of the malicious domain registration profiles.

10. The non-transitory computer-readable storage medium of claim 1, further comprising generating the domain registration profile associated with the candidate domain by:
determining that domain registration information associated with the candidate domain includes a record associated with a privacy protection service; and
generating a first vector comprising a name, an email address, and a registration address associated with the privacy protection service and included in the domain registration information associated with the candidate domain,
wherein the similarity score is generated based on comparing the first vector to a second vector associated with at least one domain cluster included in the plurality of domain clusters.

11. A method, comprising:
receiving domain registration information associated with each of a plurality of malicious domains, wherein the domain registration information associated with a given malicious domain included in the plurality of malicious domains includes information with which the malicious domain was registered with a corresponding registration entity;
generating a plurality of domain clusters based on the domain registration information and a length of time that each of the plurality of malicious domains is registered with the corresponding registration entity;
comparing a domain registration profile associated with a candidate domain to the plurality of domain clusters to generate a similarity score; and
classifying the candidate domain as a malicious domain based on the similarity score.

12. The method of claim 11, further comprising, for each domain cluster included in the plurality of domain clusters, generating a registration template, and wherein comparing the domain registration profile associated with the candidate domain to the plurality of domain clusters comprises comparing the domain registration profile to the registration templates.

13. The method of claim 12, wherein comparing the domain registration profile to the registration templates comprises:
for each of the registration templates, determining a similarity score between the domain registration profile and the registration template;

determining that at least one of the similarity scores is above a threshold level; and in response, classifying the candidate domain as a malicious domain.

14. The method of claim 13, wherein determining the similarity score between the domain registration profile and the registration template comprises comparing a first subnetwork, first registrant information, and first registration time included in the domain registration profile to a second subnetwork, second registrant information, and second registration time included in the registration template.

15. The method of claim 12, wherein generating the registration template for the domain cluster comprises determining a centroid of the domain cluster based on the domain registration information associated with each malicious domain included in the plurality of malicious domains that is also included in the domain cluster.

16. The method of claim 11, wherein generating the plurality of domain clusters comprises:

generating, for each malicious domain included in the plurality of malicious domains, a malicious domain registration profile based on the domain registration information associated with the malicious domain; and generating a plurality of initial groups of malicious domains based on network addresses associated with the malicious domain registration profiles, wherein each initial group of malicious domains included in the plurality of initial groups of malicious domains is associated with a different subnetwork.

17. The method of claim 16, wherein generating the plurality of domain clusters further comprises, for each of the initial groups of malicious domains:

computing distances between different pairs of the malicious domain registration profiles associated with the initial group of malicious domains; and based on the distances, applying one or more hierarchical clustering operations to group the malicious domains included in the initial group of malicious domains into one or more domain clusters included in the plurality of domain clusters.

18. The method of claim 11, further comprising generating the domain registration profile associated with the candidate domain by:

analyzing a domain name of the candidate domain to determine a name format;

determining a substring included in the domain name based on the name format; and generating a name selection label for the domain registration profile based on whether the substring is meaningful.

19. The method of claim 18, further comprising determining that the substring is not meaningful by:

performing a search engine query with the substring;

determining that one or more results of the search engine query include an automatic word correction; and associating a typosquatting name selection label with the domain registration profile based on the automatic word correction.

20. A computing device, comprising:

a memory storing a malicious domain detection application; and a processor that is coupled to the memory and, when executing the malicious domain detection application, is configured to:

receive domain registration information associated with each of a plurality of malicious domains, wherein the domain registration information associated with a given malicious domain included in the plurality of malicious domains includes information with which the malicious domain was registered with a corresponding registration entity;

generate a plurality of domain clusters based on the domain registration information and a length of time that each of the plurality of malicious domains is registered with the corresponding registration entity;

compare a domain registration profile associated with a candidate domain to the plurality of domain clusters to generate a similarity score; and classify the candidate domain as a malicious domain based on the similarity score.

21. The non-transitory computer-readable storage medium of claim 1, wherein generating the plurality of domain clusters comprises, for each pair of unique malicious domain names included in the plurality of malicious domain names, computing a similarity distance based on a similarity of name formats extracted from the pair, a similarity of network addresses shared by the pair, a similarity of name servers used by the pair, a type of registration entity used to register the pair, and a ratio between a first registration age of a first malicious domain included in the pair and a second registration age of a second malicious domain included in the pair.

* * * * *